(12) United States Patent
Chen et al.

(10) Patent No.: US 7,415,137 B2
(45) Date of Patent: Aug. 19, 2008

(54) IMAGE PROCESSING METHOD, APPARATUS AND STORAGE MEDIUM

(75) Inventors: Xinwu Chen, Beijing (CN); Xin Ji, Beijing (CN); Libing Wang, Beijing (CN); Yoshihiro Ishida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 866 days.

(21) Appl. No.: 10/716,671

(22) Filed: Nov. 20, 2003

(65) Prior Publication Data
US 2004/0131235 A1    Jul. 8, 2004

(30) Foreign Application Priority Data
Dec. 13, 2002  (CN) .................. 02 1 55468
Dec. 17, 2002  (CN) .................. 02 1 56660

(51) Int. Cl.
*G06K 9/00*   (2006.01)
*G06K 9/72*   (2006.01)

(52) U.S. Cl. ........................ 382/115; 382/229
(58) Field of Classification Search ......... 382/115–118, 382/229
See application file for complete search history.

(56) References Cited

U.S. PATENT DOCUMENTS

| | | | | |
|---|---|---|---|---|
| 5,636,292 | A * | 6/1997 | Rhoads ....................... | 382/232 |
| 6,697,502 | B2 * | 2/2004 | Luo ............................ | 382/115 |
| 6,940,545 | B1 * | 9/2005 | Ray et al. ................... | 348/222.1 |
| 2002/0081032 | A1 | 6/2002 | Chen et al. .................. | 382/199 |

FOREIGN PATENT DOCUMENTS

| | | |
|---|---|---|
| CN | 2000-127067.2 | 4/2002 |
| CN | 2000-00127067.2 | 4/2002 |
| JP | 2002-203239 | 7/2002 |

OTHER PUBLICATIONS

Haiyuan Wu, et al., "Face Detection From Color Images Using a Fuzzy Pattern Matching Method", IEEE Transactions on Pattern Analysis and Machine Intelligence, vol. 21, No. 6, Jun. 1999, pp. 557-563.
Haiyuan Wu, et al., "Face Detection and Rotations Estimation Using Color Information", 5th IEEE International Workshop on Robot and Human Communication, 1996, pp. 341-346.

* cited by examiner

*Primary Examiner*—Bhavesh Mehta
*Assistant Examiner*—Hadi Akhavannik
(74) *Attorney, Agent, or Firm*—Fitzpatrick, Cella, Harper & Scinto

(57) ABSTRACT

A method of processing an image includes steps of identifying one candidate for a human face region within an image; calculating a probability that the candidate for human face region represents a human face; and saving the probability as attached information to the image. The method of processing an image can also include steps of identifying one candidate for human face region within an image; calculating a probability that the candidate for human face region represents a human face; judging whether or not the candidate for human face region represents a human face by comparing the probability with a threshold; and saving a result of the step of judging as attached information to the image. According to these methods, results of identifying candidates for human face regions will be saved to the image, and further processes to be conducted on the image can be facilitated.

5 Claims, 14 Drawing Sheets

A1          A2          A3

A4          A5          A6

A7          A8          A9

...         ...         ...

A1000

B1          B2

IMAGE PROCESSING METHOD, APPARATUS AND STORAGE MEDIUM

FIELD OF THE INVENTION

The present invention relates to image processing, and particularly to the method and apparatus for processing image that includes candidates for human face region, and storage medium for storing computer programs used in processing image that includes candidates for human face region.

BACKGROUND OF THE INVENTION

A number of techniques are known for detecting areas of interest in an image, such as a face or other identified object of interest. Face detection is an area of particular interest, as face recognition has importance not only for image processing, but also for identification and security purposes, and for human-computer interface purposes. A human-computer interface not only identifies the location of a face, if a face is present, it may also identify the particular face, and may understand facial expressions and gestures.

Many studies on automatic face detection have been reported recently. References for example include "Face Detection and Rotations Estimation using Color Information," the 5th IEEE International Workshop on Robot and Human Communication, 1996, pp 341-346, and "Face Detection from Color Images Using a Fuzzy Pattern Matching Method," IEEE Transaction on Pattern Analysis and Machine Intelligence, vol. 21, no. 6, June 1999.

All the conventional methods of detecting human faces have their own advantages as well as shortcomings depending upon different algorithms used for processing images. Some methods are accurate but are complex and time-consuming.

Further, it is also very important to detect whether an image is a portrait. An image containing any human faces is called a portrait. In recent years, in association with the rapid spread of modern IT devices, a request for accurately determining a portrait has been increasing. For example, if the image can be judged as a portrait, the printer can adjust its parameters optimized for the portrait when it prints the image. Then the image's printing quality can be greatly improved. For this reason, there has been a strong demand for a device or a process, which can easily and automatically detect a portrait in an image.

Importantly, none of the conventional methods of detecting human faces saves the detecting result to the image, which makes it not convenient for further processing of the image if a particular process is needed for human face regions.

It is thus needed in the art to develop a method and apparatus that can identify human face regions within the image or determine whether an image is a portrait and save the result of the identifying process or the result of the determining process for further processing of the image.

SUMMARY OF THE INVENTION

The first objective of the invention is to provide a method and apparatus of processing an image that will save information of candidates for human face region to the image for processing of the image at a later time.

The second objective of the invention is to provide a method and apparatus of processing an image in which information of candidates for human face region has been saved.

The third objective of the invention is to provide a method and apparatus of processing an image that will save information of portrait to the image for processing of the image at a later time.

The fourth objective of the invention is to provide a method and apparatus of processing an image in which information of portrait has been saved.

For the attainment of the above objectives, the present invention provides a method of processing an image, characterized by comprising steps of:

identifying one candidate for human face region within said image;

calculating a probability that said candidate for human face region represents a human face; and saving said probability as attached information to said image.

The present invention also provides a method of processing an image, characterized by comprising steps of:

identifying one candidate for human face region within said image;

calculating a probability that said candidate for human face region represents a human face;

judging whether or not said candidate for human face region represents a human face by comparing said probability with a threshold; and saving a result of said step of judging as attached information to said image.

The present invention further provides an apparatus for processing an image, characterized by comprising:

a candidate selector for identifying one candidate for human face region within said image;

a probability calculator for calculating a probability that said candidate for human face region represents a human face; and a probability writer for writing said probability as attached information to said image.

The present invention further provides an apparatus for processing an image, characterized by comprising:

a candidate selector for identifying one candidate for human face region within said image;

a probability calculator for calculating a probability that said candidate for human face region represents a human face; and a judging unit for judging whether said candidate for human face region represents a human face by comparing said probability with a threshold; and a judging result writer for writing an output of said judging unit as attached information to said image.

The present invention further provides a method of processing an image, characterized by comprising steps of:

obtaining at least one probability, each of said at least one probability representing possibility that one candidate for human face region within said image represents a human face;

calculating a portrait probability for said image based on said at least one probability; and saving said portrait probability as attached information to said image.

The present invention further provides a method of processing an image, characterized by comprising steps of:

obtaining at least one probability, each of said at least one probability representing possibility that one candidate for human face region within said image represents a human face;

calculating a portrait probability for said image based on said at least one probability; and judging whether or not said image is a portrait by comparing said portrait probability with a threshold; and saving a result of said step of judging as attached information to said image.

The present invention further provides an apparatus for processing an image, characterized by comprising:

a probability for candidate for human face region calculator, for obtaining at least one probability, each of said at least one probability representing possibility that one candidate for human face region within said image represents a human face;

a portrait probability calculator for calculating a portrait probability of said image that said image is portrait; and a probability writer for writing said probability as attached information to said image.

The present invention further provides an apparatus for processing an image, characterized by comprising:

a probability for candidate for human face region calculator, for obtaining at least one probability, each of said at least one probability representing possibility that one candidate for human face region within said image represents a human face;

a portrait probability calculator for calculating a probability that said candidate for human face region represents a human face; and a judging unit for judging whether said image is portrait by comparing said probability with a threshold; and a judging result writer for writing an output of said judging unit as attached information to said image.

The present invention further provides a storage medium storing a computer program for processing an image, characterized by comprising:

code means for identifying one candidate for human face region within said image;

code means for calculating a probability that said candidate for human face region represents a human face; and code means for saving said probability as attached information to said image.

The present invention further provides a storage medium storing a computer program for processing an image, characterized by comprising:

code means for identifying one candidate for human face region within said image;

code means for calculating a probability that said candidate for human face region represents a human face;

code means for judging whether or not said candidate for human face region represents a human face by comparing said probability with a threshold; and code means for saving a result of said step of judging as attached information to said image.

The present invention further provides a storage medium storing a computer program for processing an image, characterized by comprising:

code means for obtaining at least one probability, each of said at least one probability representing possibility that one candidate for human face region within said image represents a human face;

code means for calculating a portrait probability for said image based on said at least one probability; and code means for saving said portrait probability as attached information to said image.

The present invention further provides a storage medium storing a computer program for processing an image, characterized by comprising:

code means for obtaining at least one probability, each of said at least one probability representing possibility that one candidate for human face region within said image represents a human face;

code means for calculating a portrait probability for said image based on said at least one probability; and code means for judging whether or not said image is a portrait by comparing said portrait probability with a threshold; and code means for saving a result of said step of judging as attached information to said image.

According to the method of the present invention, results of identifying candidates for human face regions or results of calculating portrait probability will be saved to the image, and further processes to be conducted on the image will be facilitated.

Also, a conventional image processing apparatus can be trained to possess the ability of detecting human faces. The method of detecting human face according to the present invention is both accurate and quick.

Additionally, the method of the present invention can be easily combined-with different algorithms used in conventional methods of detecting human faces so as to fit in different situations.

According to the method of the present invention, it can be judged whether the image is a portrait or not and the result of the judgment is saved to the image. When the image is judged as a portrait, the printer can adjust its parameters optimized for the portrait such that the printing quality of the image will be improved. Further, some image processing methods optimized for portrait can be performed in display devices on the image so as to improve the display quality of the image.

Other features and advantages of the present invention should be apparent from the following description of the preferred embodiments, taken in conjunction with the accompanying drawings, which illustrate, by way of example, the principles of the invention.

DETAILED DESCRIPTION OF THE PREFERRED EMBODIMENTS

The embodiments of the present invention will be described in detail. In the following description, as to how to identify one candidate for human face region within an image, reference can be made to Chinese Patent Application No. 00127067.2, which was filed by the same applicant on Sep. 15, 2000, and made public on Apr. 10, 2002. This application is incorporated herein by reference. However, the method of identifying candidates for human face regions disclosed in Chinese Patent Application No. 00127067.2 constitutes no restriction to the present invention. Any conventional method of identifying candidates for human face regions within an image may be utilized in the present invention.

Figure 1:
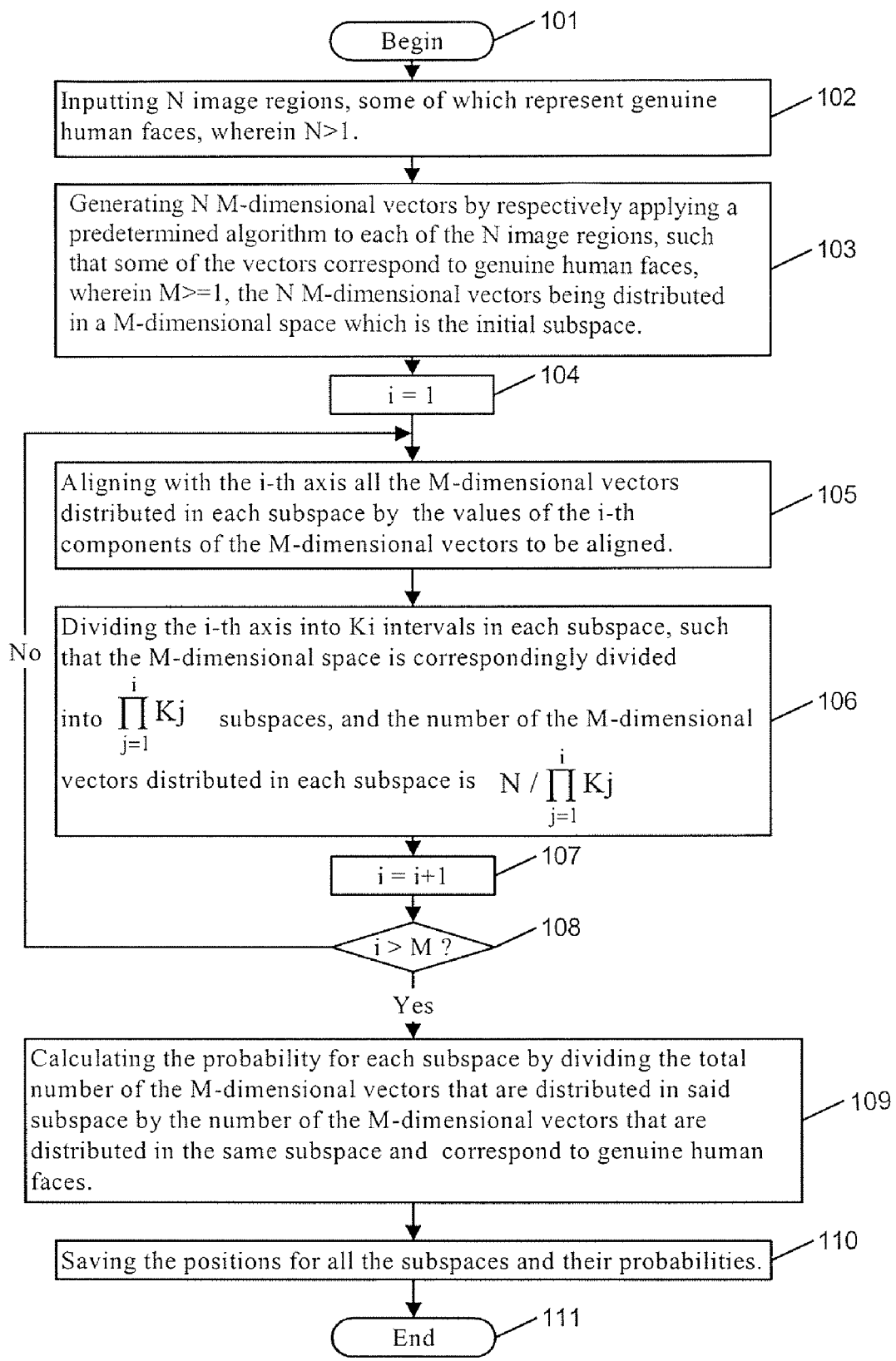
FIG. 1 is the flowchart of the method of training an image processing apparatus in one embodiment of the present invention.

FIG. 1 is the flowchart of the method of training an image processing apparatus in one embodiment of the present invention. The process starts at step 101. At step 102, a plurality of image regions are inputted. These image regions may be obtained from a single image or a plurality of images. Some of these image regions represent genuine human faces. It is known beforehand which image regions represent genuine human faces. These image regions are called as "training samples." In FIG. 1, the number of training samples are N, wherein N is an integer greater than one.

At step 103., for each of the image regions inputted in step 102, a predetermined algorithm will be applied thereon such that a M-dimensional vector will be generated, wherein M is an integer equal to or greater than one. In the case that M takes the value of one, the predetermined algorithm generates a scalar value for each inputted image region.

In the above way, a plurality of M-dimensional vectors will be generated. The number of the generated M-dimensional vectors is the same as N. Since it is known beforehand which training sample (i.e., image region) represents a genuine human face, it will also be known which M-dimensional vector corresponds to a genuine human face.

The present invention does not concern the detailed process within the predetermined algorithm as long as the algorithm generates a M-dimensional vector for each inputted image region. Thus, the predetermined algorithm can be any conventional method of processing data for an image. The vector generated by the predetermined algorithm represents some characteristics of the image region upon which the predetermined algorithm is applied. Two examples of these algorithms will be given later with reference to FIG. 9 (see Example One, and Example Two).

After step 103, N M-dimensional vectors will be generated, and they are distributed in a M-dimensional space.

Following steps 104 to 108 constitute a way of dividing the M-dimensional space into a plurality of subspaces, the number of which is denoted as $$\prod_{j=1}^{M} Kj$$

and within which the same number of M-dimensional vectors are distributed. The number of the M-dimensional vectors distributed in each subspace is denoted as $$N / \prod_{j=1}^{M} Kj,$$

wherein K1, K2, ..., KM are integers greater than one.

It should be note that there are numerous ways of dividing the M-dimensional space into $$\prod_{j=1}^{M} Kj$$

subspaces. Steps 104 to 108 just show an example and do not constitute a restriction to the present invention.

In step 104, the value "one" is assigned to variable i.

In step 105, all the M-dimensional vectors distributed in each subspace will be aligned with the i-th axis by the values of the i-th components of the M-dimensional vectors to be aligned.

In step 106, the i-th axis in each subspace will be divided into Ki intervals, such that the M-dimensional space will be correspondingly divided into $$\prod_{j=1}^{i} Kj$$

subspaces, and the number of the M-dimensional vectors distributed in each subspace will be $$N / \prod_{j=1}^{i} Kj.$$

In step 107, variable i increases by one.

In step 108, it is judged whether variable i is greater than M. If the judging result of step 108 is negative, the process will go to step 105; otherwise go to step 109.

In step 109, the probability for each subspace is calculated. Within one subspace, the number of the M-dimensional vectors corresponding to genuine human faces is first counted.

Then, the total number of the M-dimensional vectors distributed in the subspace, i.e., $$N / \prod_{j=1}^{M} Kj,$$

is divided by the above number of M-dimensional vectors corresponding to genuine human faces. The result of the division is taken as the probability for the subspace. The probability for a subspace means the possibility that a vector distributed in this subspace corresponds to a genuine human face.

In optional step 110, the positions and probabilities for all the subspaces are saved for example to a memory or storage within the image processing apparatus.

In step 111, the training process ends.

To facilitate the understanding of the flowchart shown in FIG. 1, two examples are given as follows.

EXAMPLE ONE

Figure 9:
FIG. 9 shows a training sequence including 1000 training samples, i.e., image regions A1, A2, A3, . . . , A1000.
Figure 9:
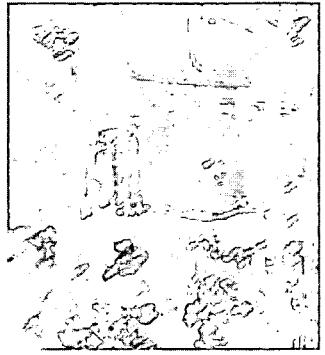
Figure 9:
Figure 9:
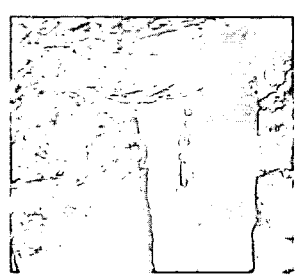
Figure 9:
Figure 9:
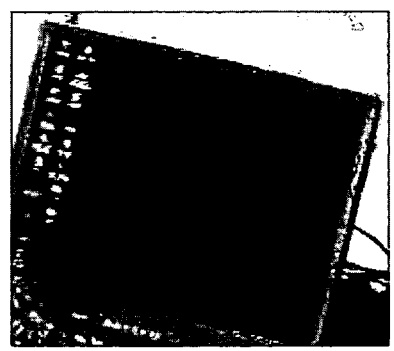

Refer to FIG. 9, which shows a training sequence composed of 1000 training samples, i.e., image regions A1, A2, A3, ..., A1000. Thus, N in FIG. 1 takes the value of 1000.

In FIG. 9, it is known beforehand that which image regions represent genuine human faces and which image regions do not. For instance, image regions A1, A5 represent genuine human faces, and image regions A2, A3, A4, A6 do not represent human faces.

The predetermined algorithm applied in Example One generates a scalar value, i.e., a M-dimensional vector where M=1. Being an example, the predetermined algorithm used in this example generates the proportion of the areas belonging to skin color to the whole image region.

Take image region A1 for example. The total number of pixels in image region A1 is 10000, wherein the number of pixels belonging to skin color is 8000. Thus, the proportion of areas belonging to skin color to the whole image region is 8000/10000=0.8.

When respectively applying the above predetermined algorithm to image regions A1, A2, ..., A1000, 1000 scalar values, called training scalar values, will be obtained, which are shown as:

0.8, 0.2, 0.3, 0.5, 0.7, 0.1 ....

Next, along the real axis, aligning the above training scalar values in an ascending order, and obtaining the sequence:

..., 0.1, ..., 0.2, ..., 0.3, ..., 0.5, ..., 0.7, ..., 0.8, ...

Then, dividing the real axis into M intervals, such that each interval will include the same number of training scalar values. The number of training scalar values within each interval equals to N/M.

Assuming M=10, the real axis will be divided into 10 intervals (i.e., 10 subspaces, each of which is 1-dimensional), which for example are:

(−∞, 0.111],
(0.11, 0.2],
(0.2, 0.32],
(0.32, 0.39],
(0.39, 0.45],
(0.45, 0.56],
(0.56, 0.66],
(0.66, 0.73],
(0.73, 0.85],
(0.85, +∞).

The intervals are open at left ends and closed at right ends, or closed at left ends and open at right ends. In each interval, i.e., 1-dimensional subspace, there are N/M=1000/10=100 training scalar values.

Next, calculating the probability for each interval. For the 10 intervals divided as above, the numbers of training scalar values corresponding to genuine human faces within the 10 intervals are:

5, 11, 16, 28, 32, 44, 52, 61, 77, 43.

The total number of training scalar values in each interval is N/M=1000/10=100.

Then, the probability for each of the 10 intervals is respectively:

0.05, 0.11, 0.16, 0.28, 0.32, 0.44, 0.52, 0.61, 0.77, 0.43.

In the last step, the positions and probabilities are saved for the 10 intervals.

EXAMPLE TWO

FIG. 9 shows a training sequence including 1000 training samples, i.e., image regions A1, A2, A3, ..., A1000. In this example, only image regions A1, A2, A3, ..., A900 are used. Thus, N in FIG. 1 takes the value of 900.

As stated above, it is known beforehand that which image regions represent genuine human faces and which image regions do not. For instance, image regions A1, A5 represent genuine human faces, and image regions A2, A3, A4, A6 do not represent human faces.

The predetermined algorithm applied in Example Two generates a 2-dimensional vector, i.e., a M-dimensional vector where M=2. Being an example, the predetermined algorithm used in this example generates the average and weighted angle between the gradients of the gray level distribution and a reference distribution in an annular region. For detailed explanation of this algorithm, please refer to Chinese Patent Application No. 01132807.X.

When respectively applying this algorithm to image regions A1, A2, ..., A900, the following 2-Dimensional vectors called as training vectors will be obtained:

(0.23, 0.14), (−0.6, −0.71), (0.44, 0.51), (0.52, 0.74), (−0.16, −0.22), (0.58, 0.46), ...

Next, on the 1st axis, i.e., the real axis, aligning the 900 2-Dimensional vectors by the values of the 1st components of these vectors in an ascending order, obtaining the following sequence:

..., (−0.6, −0.71), ..., (−0.16, −0.22), ..., (0.23, 0.14), ..., (0.44, 0.51), ..., (0.52, 0.74), ..., (0.58, 0.46), ...

Then, dividing the real axis into P intervals, and correspondingly the 2-Dimensional space into P subspaces, such that each of the P subspaces will include N/P 2-Dimensional vectors.

Assuming P=10, the 10 intervals will be:

(−∞, −0.6],
(−0.6, −0.33],
(−0.33, −0.12],
(−0.12, 0.09],
(0.09, 0.15],
(0.15, 0.26],
(0.26, 0.44],
(0.44, 0.57],
(0.57, 0.73],
(0.73, +∞).

All the intervals are open at left ends and closed at right ends, or closed at left ends and open at right ends.

Within each subspace, there are N/P=90 training vectors.

Next, within each subspace, aligning the training vectors along the 2nd axis by the values of the 2nd components of the training vectors in an ascending order.

For instance, in the subspace corresponding to interval (−0.12,0.09], the following training vectors are distributed:
..., (−0.1, 0.2), ..., (−0.05, 0.01), ..., (−0.03, 0.3), ..., (0.01, −0.1), ..., (0.03, −0.22), ..., (−0.06, −0.5), ...

Aligning these vectors by the values of the 2nd components results in the following sequence:
..., (−0.06, −0.5), ..., (0.03, −0.22), ..., (0.01, −0.1), ..., (−0.05, 0.01), ..., (−0.1, 0.2), ..., (−0.03, 0.3), ...

Within each subspace, dividing the 2nd axis into Q intervals, and correspondingly each subspace into Q subspaces, such that each subspace eventually obtained includes the same number of 2-Dimensional vectors, the number of which is N/(P*Q).

Assuming Q=9, for each subspace obtained by dividing the real axis, the 2nd axis is divided into 9 intervals.

Take the subspace corresponding to interval (−0.12,0.09] for example. The resulted 9 intervals are:
(−∞, −0.5],
(−0.5, −0.35]
(−0.35, −0.18],
(−0.18, 0.04]
(0.04, 0.17],
(0.17, 0.31],
(0.31, 0.54],
(0.54, 0.77],
(0.77, +∞)

All the intervals are open at left ends and closed at right ends, or closed at left ends and open at right ends.

In each subspace, there are N/(P*Q)=10 training vectors.

In the above way, the 2-Dimensional space is eventually divided into the following (P*Q)=90 subspaces:
((−∞, −0.6), (−∞, −0.53)), ..., ((−∞, −0.6], (0.71, +∞)),
((−0.6, −0.33), (−∞, −0.58)), ..., ((−0.6, −0.33], (0.56, +∞))
((−0.12, 0.09), (−∞, −0.5)), ..., ((−0.12, 0.09], (0.04, 0.17)), ..., ((−0.12, 0.09), (0.77, +∞)) ...
((0.73, +∞), (−∞, −0.65)), ..., ((0.73, +∞) , (0.61, +∞))

In each subspace, N/(P*Q)=10 training vectors are distributed.

In the next step, calculating the probability for each subspace.

Assuming the number of training vectors corresponding to genuine human faces are respectively:
1, ..., 2, 0, ..., 3, ... 3, ..., 8, ..., 2, ..., 0, ..., 1

Since the total number of training vectors distributed in each subspace is N/(P*Q)=900/(10*9)=10, the probabilities for the 90 subspaces are:
0.1, ..., 0.2, 0, ..., 0, ..., 0.3, ..., 0.8, ..., 0.2, ..., 0, ..., 0.1.

In the last step, the positions and probabilities are saved for the 90 subspaces.

Figure 2:
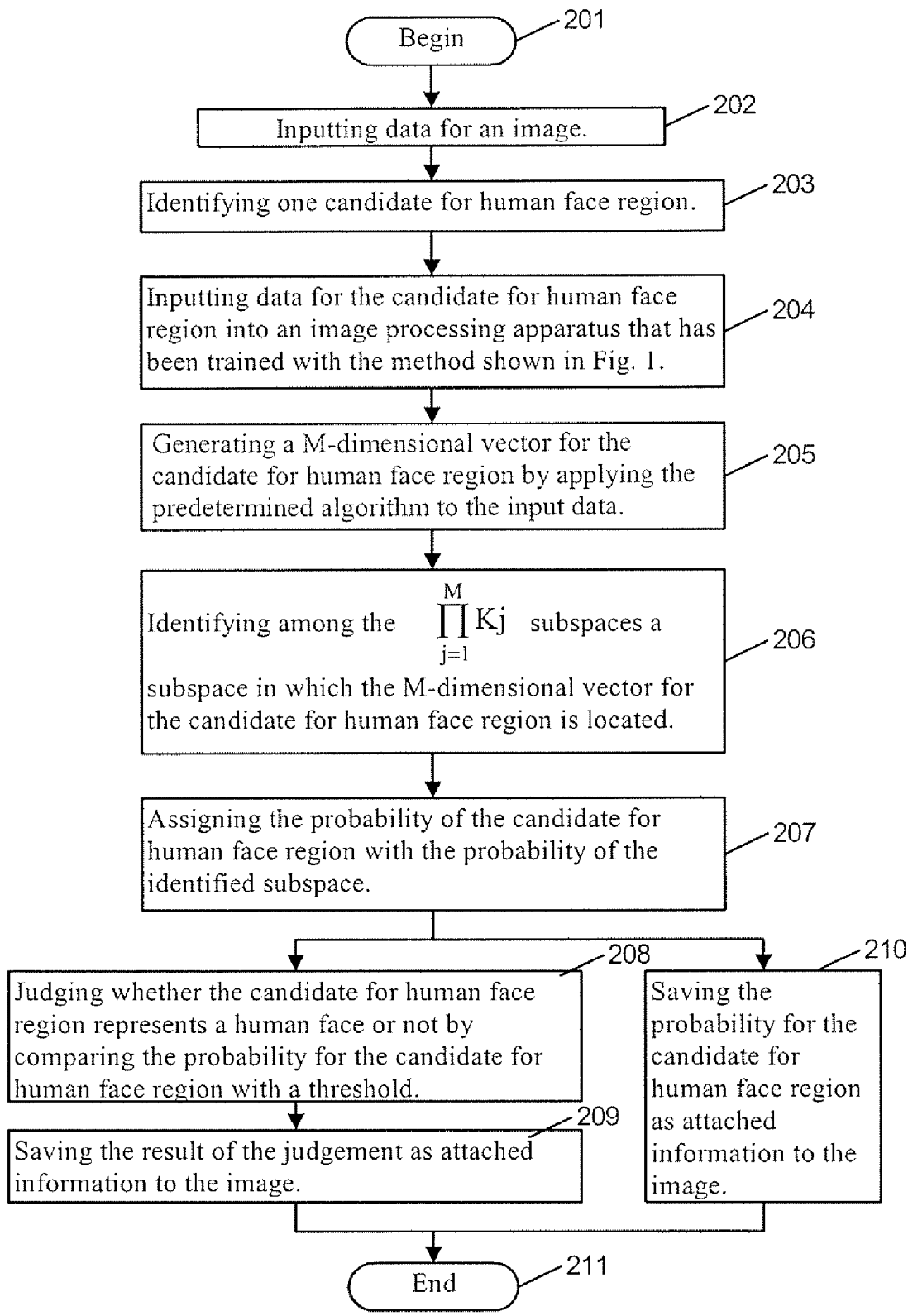
FIG. 2 is the flowchart of the method of processing an image according to the present invention, in which an image processing apparatus that has been trained with the method shown in FIG. 1 is used.

FIG. 2 is the flowchart of the method of processing an image according to the present invention, in which an image processing apparatus that has been trained with the method shown in FIG. 1 is used. The process begins at step 201. An image is inputted at step 202. In order to detect a human face within the image to be processed, one candidate for human face region is identified within the image at step 203. At step 204, the data for the above candidate for human face region is inputted to an image processing apparatus that has been trained with the method shown in FIG. 1.

At step 205, within the image processing apparatus, the predetermined algorithm that has been used in the training process of the image processing apparatus is applied to the data for the candidate for human face region, and a M-dimensional vector is generated for the candidate for human face region.

At step 206, one subspace, in which the above M-dimensional vector is located, is identified among the $$\prod_{j=1}^{M} Kj$$

subspaces. These $$\prod_{j=1}^{M} Kj$$

subspaces are formed during the training process of the image processing apparatus, and their information (for instance, the positions, and probabilities) has been saved in the image processing apparatus.

At step 207, the value of the probability for the identified subspace is assigned to the candidate for human face region (identified at step 203).

In this way, the probability for each candidate for human face region can be easily obtained within an image processing apparatus that has been trained with the method shown in FIG. 1. Also, since the probabilities for $$\prod_{j=1}^{M} Kj$$

subspaces have been saved in the image processing apparatus, the calculation amount can be greatly reduced in the detection of a human face.

It should be understood that steps 204 to 207 just constitute an embodiment of the present invention and make no restriction to the invention. Any conventional methods may be adopted if a probability that the candidate for human face region, as identified in step 203, represents a human face can be calculated by these conventional methods.

At step 208, it is judged whether the candidate for human face region represents a human face or not by comparing the probability for the candidate for human face region with a threshold.

At step 209, the result of the judgment is saved as attached information to the image, for example, to the header file or footer file of the image in a predetermined format. At step 209, identification information of the candidate for human face region can also be saved as additional attached information to the image, for example, to the header file or footer file of the image in a predetermined format.

At step 210, the probability for the candidate for human face region is saved as attached information to the image, for example, to the header file or footer file of the image in a predetermined format. At step 210, identification information of the candidate for human face region can also be saved as additional attached information to the image, for example, to the header file or footer file of the image in a predetermined format.

In both of steps 209 and 210, the predetermined format for saving the attached information and additional attached information is not important and does not constitute a restriction to the present invention. Any conventional format or data structure for saving data may be used.

Figure 4:
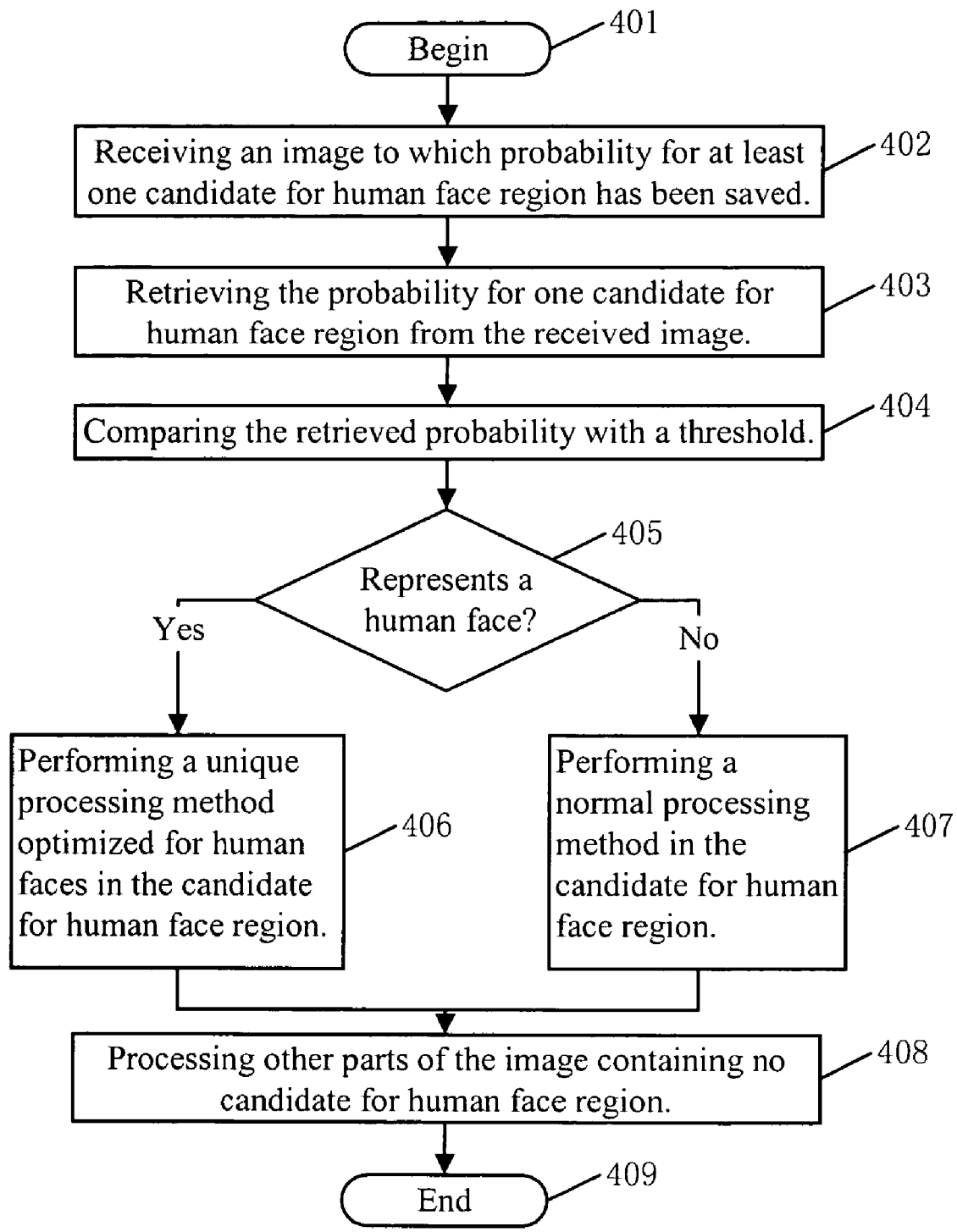
FIG. 4 is the flowchart of another method of processing an image to which probability for at least one candidate for human face region has been saved.
Figure 5:
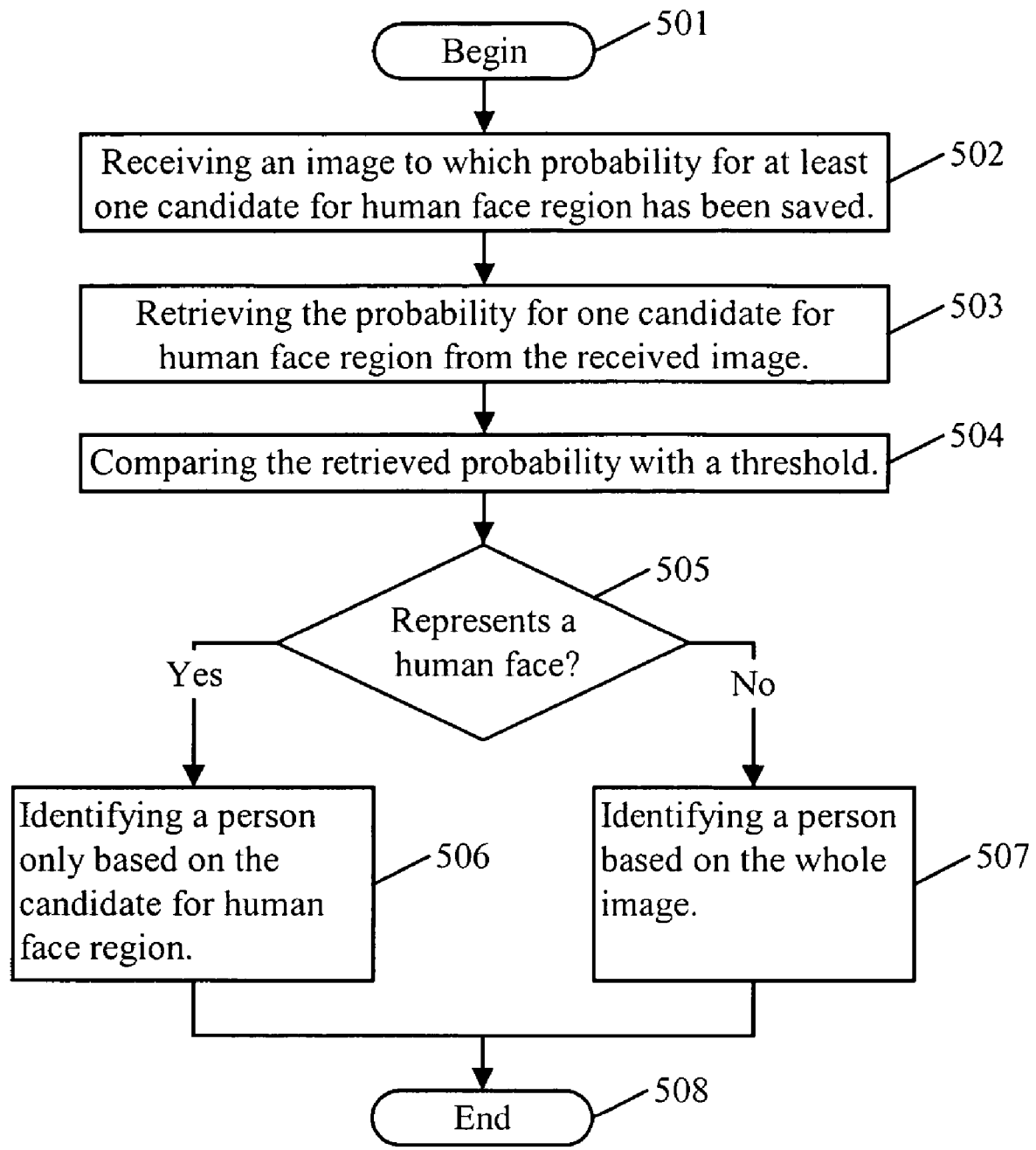
FIG. 5 is the flowchart of a method of identifying a person in an image to which probability for at least one candidate for human face region has been saved.

The image to which judging results or probabilities have been saved can be used widely. FIGS. 4 and 5 will illustrate some application of such kind of images.

The above process ends at step 211.

EXAMPLE THREE

Figure 10:
FIG. 10 shows two image regions B1, B2 for testing.
Figure 10:

Now refer to FIG. 10, which shows two image regions B1, B2 for testing. As shown in FIG. 10, image region B1 shows a human face, while image region B2 does not. The following description will demonstrate the excellent results of the detecting method of the present invention.

Take the algorithm used in Example One for example.

If image region B1 is identified as one candidate for human face region, a scalar value 0.75 will be generated by the algorithm, which falls in the interval (0.73, 0.85]. Since the probability for this interval is 0.77, the probability of image region Bi also takes the value of 0.77.

If image region B2 is identified as one candidate for human face region, a scalar value 0.31 will be generated by the algorithm, which falls in the interval (0.2, 0.32). Since the probability of this interval is 0.16, the probability of image region B2 also takes the value of 0.16.

Apparently, the probability for one candidate for human face region which actually represents a human face is increased (from 0.75 to 0.77), and the probability for one candidate for human face region which actually does not represent a human face is decreased (from 0.31 to 0.16). That is, the accuracy of detecting a human face is increased in the present invention.

EXAMPLE FOUR

Reference is also made to FIG. 10 which shows two image regions B1, B2 for testing.

Take the algorithm used in Example Two for example.

If image region B1 is identified as one candidate for human face region, a 2-dimensional vector (0.05, 0.11) will be generated by the algorithm, which falls in the subspace ((−0.12, 0.09], (0.04, 0.17]). Since the probability of this subspace is 0.8, the probability of image region B1 also takes the value of 0.8.

If image region B2 is identified as one candidate for human face region, a 2-dimensional vector (−0.71, −0.66) will be generated by the algorithm, which falls in the subspace ((−∞, −0.6), (−∞, −0.53)). Since the probability of this subspace is 0.1, the probability of image region B2 also takes the value of 0.1.

A different algorithm is used in this example, and the accuracy of detecting a human face is further increased, compared with Example Three.

Figure 3:
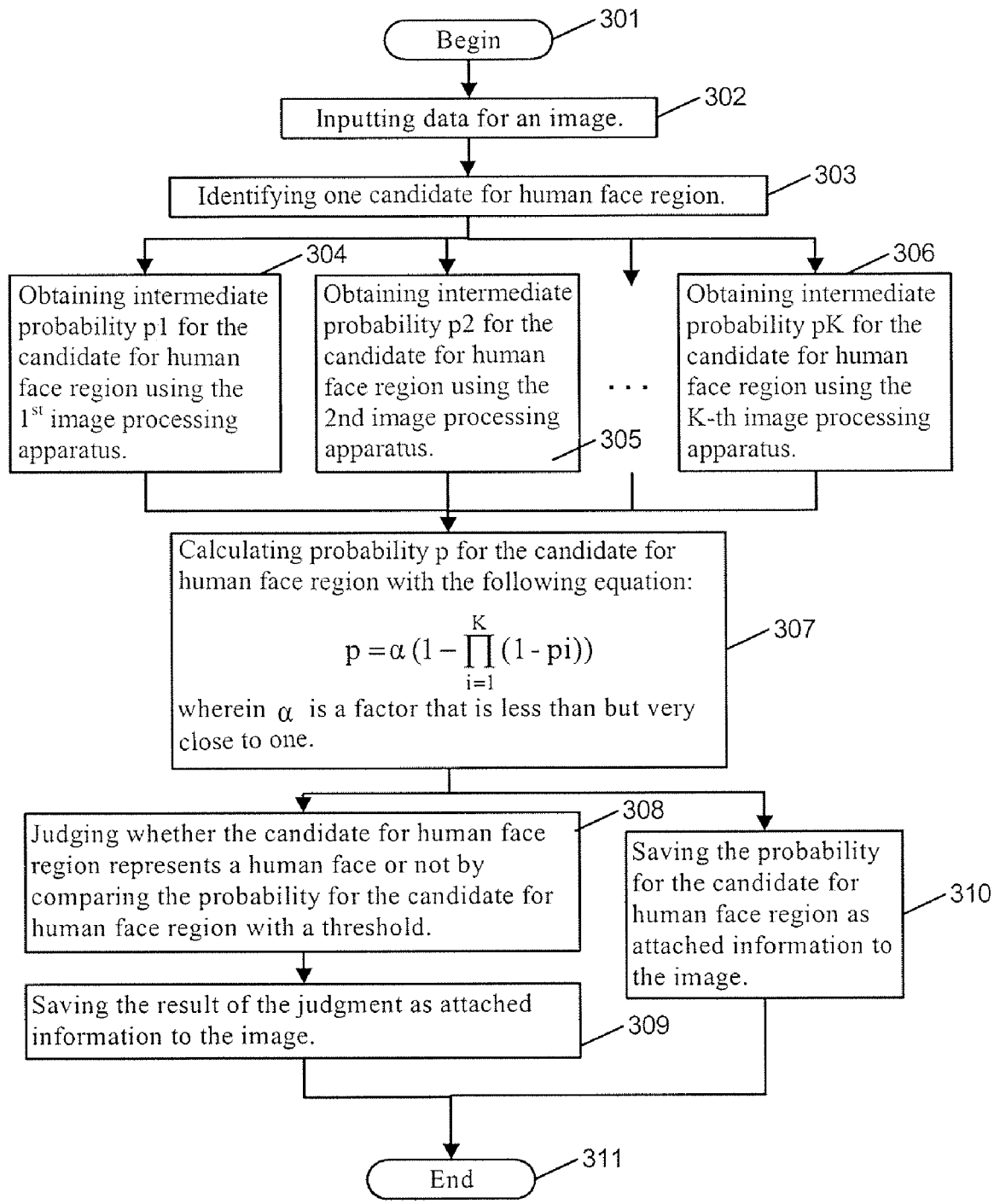
FIG. 3 is the flowchart of another method of processing an image according to the present invention, in which a plurality of image processing apparatuses that have been trained with the method shown in FIG. 1 are used.

FIG. 3 is the flowchart of another method of processing an image according to the present invention, in which a plurality of image processing apparatuses that have been trained with the method shown in FIG. 1 are used.

The process starts at step 301. Then at step 302, the data for an image is inputted. At step 303, one candidate for human face region is identified within the inputted image.

At steps 304 through 306, aplurality of probabilities, which are called intermediate probabilities, for the candidate for human face region are obtained using a plurality of image processing apparatuses that have been trained with the method shown in FIG. 1. The number of the plurality of image processing apparatuses for example is K. K is an integer equal to or greater than one. The detailed process of obtaining a probability using an individual image processing apparatus resembles the method shown in FIG. 2.

Different algorithms may be used in different image processing apparatuses. But, of course, for each image processing apparatus, the algorithm used in the training process of the image processing apparatus and the algorithm used in the detailed process of obtaining the probability should be the same.

After steps 304 through 306, K intermediate probabilities p1, p2, . . . , pK are obtained.

At step 307, a probability is calculated for the candidate for human face region based on the above intermediate probabilities p1, p2, . . . , pK, with the following equation:

$$p = \alpha \left(1 - \prod_{i=1}^{K} (1 - pi)\right)$$

wherein $\alpha$ is a factor that is less than but very closed to one.

It should be understood that steps 304 to 307 just constitute an embodiment of the present invention and make no restriction to the invention. Any conventional methods may be adopted if a probability that the candidate for human face region, as identified in step 303, represents a human face can be calculated by these conventional methods.

At step 308, it is judged whether the candidate for human face region represents a human face or not by comparing the probability for the candidate for human face region with a threshold.

At step 309, the result of the judgment is saved as attached information to the image, for example, to the header file or footer file of the image in a predetermined format. At step 309, identification information of the candidate for human face region can also be saved as additional attached information to the image, for example, to the header file or footer file of the image in a predetermined format.

At step 310, the probability for the candidate for human face region is saved as attached information to the image, for example, to the header file or footer file of the image in a predetermined format. At step 310, identification information of the candidate for human face region can also be saved as additional attached information to the image, for example, to the header file or footer file of the image in a predetermined format.

In both of steps 309 and 310, the predetermined format for saving the attached information and additional attached information is not important and does not constitute a restriction to the present invention. Any conventional format or data structure for saving data may be used.

The image to which judging results or probabilities have been saved can be used widely. FIGS. 4 and 5 will illustrate some applications of such kind of images.

The above process ends at step 311.

EXAMPLE FIVE

Reference is also made to FIG. 10 which shows two image regions B1, B2 for testing.

As stated above in Example Three and Example Four, the probabilities (i.e., intermediate probabilities) for image region B1 is 0.77 and 0.8.

Let α be 0.9.

The probability for image region B1 will be calculated as 0.9*(1−(1−0.77)*(1−0.8))=0.86.

As stated above in Example Three and Example Four, the probabilities (i.e., intermediate probabilities) for image region B2 is 0.16 and 0.1.

Let α be 0.9.

The probability for image region B2 will be calculated as 0.9*(1−(1−0.16)*(1−0.1))=0.22.

From FIG. 3 and its description, it is apparent that if both K and α take the value of one, the method shown in FIG. 3 will be the same as that shown in FIG. 2.

FIG. 4 is the flowchart of another method of processing an image to which probability for at least one candidate for human face region has been saved. The process starts at step 401. At step 402, an image to which probability for at least one candidate for human face region has been saved is received.

As stated above, the probability information might be saved as attached information in the header file or footer file of the image in a predetermined format.

At step 403, the probability for one candidate for human face region is retrieved from the image, for example from the header file or footer file of the image.

At step 404, the retrieved probability is compared with a threshold. At step 405, it is decided based on the comparison result of step 404 whether the current candidate for human face region represents a human face. The above threshold can be selected in such a way that any candidate for human face region having a probability above the threshold represents a human face.

If the judging result of step 405 is positive, i.e., the candidate for human face region represents a human face, the process goes to step 406; otherwise, step 407.

At step 406, a unique processing method optimized for human faces is performed in the candidate for human face region. The unique processing method might be performed by a printer, for example, a printer driver or an application program for printer 1713 in FIG. 17, such that human faces will be printed with improved printing quality. The unique processing method may also be performed by a display, for example an application program for display 1714 in FIG. 17, such that human faces will be displayed with high quality.

The unique processing method in step 406 may be any process performed on an image. For example, it may be a process of correcting red eyes in an image, or a process of toning down skin color in an image. The value of the threshold used in step 404 may be selected as a higher value or as a lower value according to different applications.

In the circumstance of red eye correcting, for example, it would be unacceptable to users if a portion of an image (for instance, a red logo) that is not an eye is corrected as a red eye. Thus, the threshold in step 404 could be set to a higher value so that less candidates for human face regions would be judged as representing human face and thus less portions of the image would be corrected as red eyes.

In the circumstance of toning down human skin in an image, for example, it would be acceptable (sometimes unnoticeable) to users if a portion of an image (such as a table) that includes no human skin color is toned down. Thus, the threshold in step 404 could be set to a lower value so that more candidates for human face regions would be judged as representing human face and thus more portions of the image would be toned down.

In one word, the threshold used in step 404 may be selected according to the users' satisfaction of the processing result of the image.

At step 407, a normal processing method is performed in the candidate for human face region.

At step 408, other parts of the image that contain no candidates for human face region are processed. If there are other candidates for human face regions and their probabilities are included in the image, the process will go to step 403.

The process ends at step 409.

FIG. 5 is the flowchart of a method of identifying a person in an image to which probability for at least one candidate for human face region has been saved. The process starts at step 501. At step 502, an image to which probability for at least one candidate for human face region has been saved is received. As stated above, the probability information might be saved as attached information in the header file or footer file of the image in a predetermined format. At step 503, the probability for one candidate for human face region is retrieved from the image, for example from the header file or footer file of the image.

At step 504, the retrieved probability is compared with a threshold. At step 505, it is decided based on the comparison result of step 504 whether the current candidate for human face region represents a human face. The above threshold can be selected in such a way that any candidate for human face region having a probability above the threshold represents a human face.

The threshold used in step 504 can be selected in the same principle as in step 404 of FIG. 4.

If the judging result of step 505 is positive, i.e., the candidate for human face region represents a human face, the process goes to step 506; otherwise, step 507.

At step 506, a person is identified only based on the candidate for human face region, while at step 507, a person is identified based on the whole image normally. It is easy to understand that if a person is identified only based on his/her face instead of the whole image, the identification process for this person will be greatly accelerated, and accuracy will be increased.

The process ends at step 508.

Figure 6:
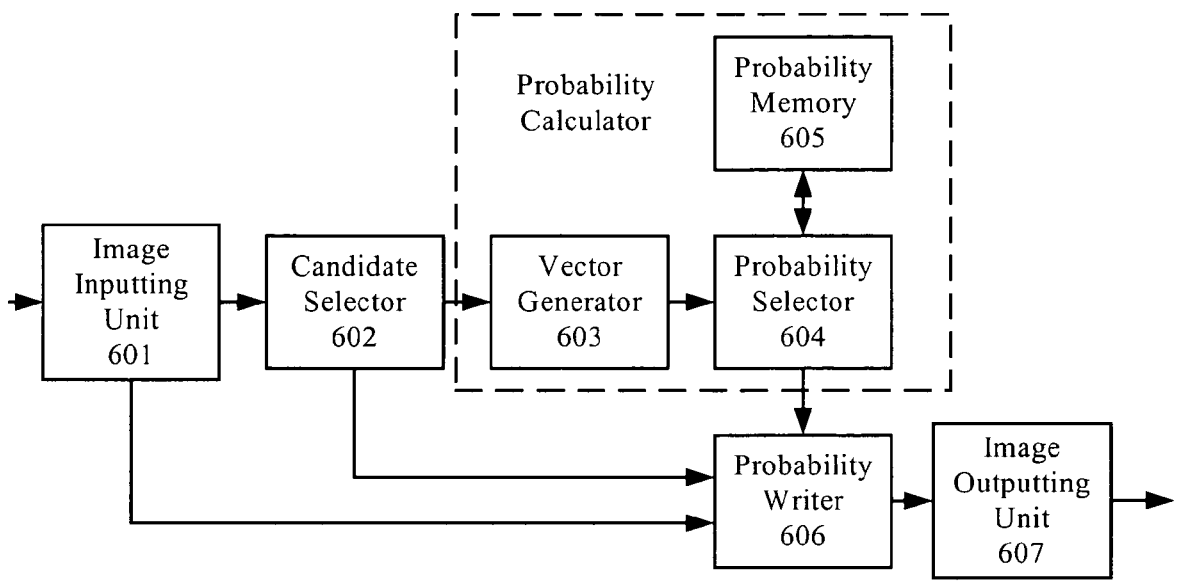
FIG. 6 is a schematic block diagram of an apparatus for processing an image according to the present invention.

FIG. 6 is a schematic block diagram of an apparatus for processing an image according to the present invention. 601 denotes an image inputting unit, 602 a candidate selector, 603 a vector generator, 604 a probability selector, 605 a probability memory, 606 a probability writer, 607 an image outputting unit. The key components of the apparatus shown in this figure are vector generator 603, probability selector 604 and probability memory 605.

As shown in FIG. 6, the components enclosed by the broken line constitute a probability calculator. Although it is shown that the probability calculator is composed of vector generator 603, probability selector 604 and probability memory 605, it should be understood that any conventional components may be taken to form a probability calculator. That is, vector generator 603, probability selector 604 and probability memory 605 do not constitute a restriction to the probability calculator. The important is that the probability calculator will calculate a probability that one candidate for human face region represents a human face.

The apparatus shown in FIG. 6 has been trained with the method shown in FIG. 1, and the positions and probabilities for all the subspaces are saved in probability memory 605. Probability memory 605 may take anyform, suchas ROM, EPROM, RAM, harddisk, etc. Different storage media and different storage schemes for positions and probabilities of the subspace do not constitute restrictions to the present invention.

Image inputting unit 601 receives an image and inputs its data into the apparatus for processing. Candidate selector 602 selects a portion of the inputted image and identifies this portion as one candidate for human face region. Vector generator 603 performs the predetermined algorithm that has been used in the training process of the image processing apparatus on the data for the candidate for human face region, and generates a M-dimensional vector for the candidate for human face region.

Since the algorithm used by vector generator 603 and the algorithm used in the training process of the image processing apparatus are the same, the M-dimensional vector surely belong to a subspace whose position and probability has been saved in probability memory 605.

Probability selector 604 retrieves a probability from probability memory 605 on the basis of the M-dimensional vector generated by vector generator 603.

Probability writer 606 writes the probability retrieved by probability selector 604 as attached information into the image being processed, for instance, to its header file or footer file in a predetermined format. Probability writer 606 may also writes identification information of the candidate for human face region as additional attached information to the image, for example, to the header file or footer file of the image in a predetermined format.

The predetermined format for saving the attached information and additional attached information is not important and does not constitute a restriction to the present invention. Any conventional format or data structure for saving data may be used.

Image outputting unit 607 outputs the image for further processing.

Figure 7:
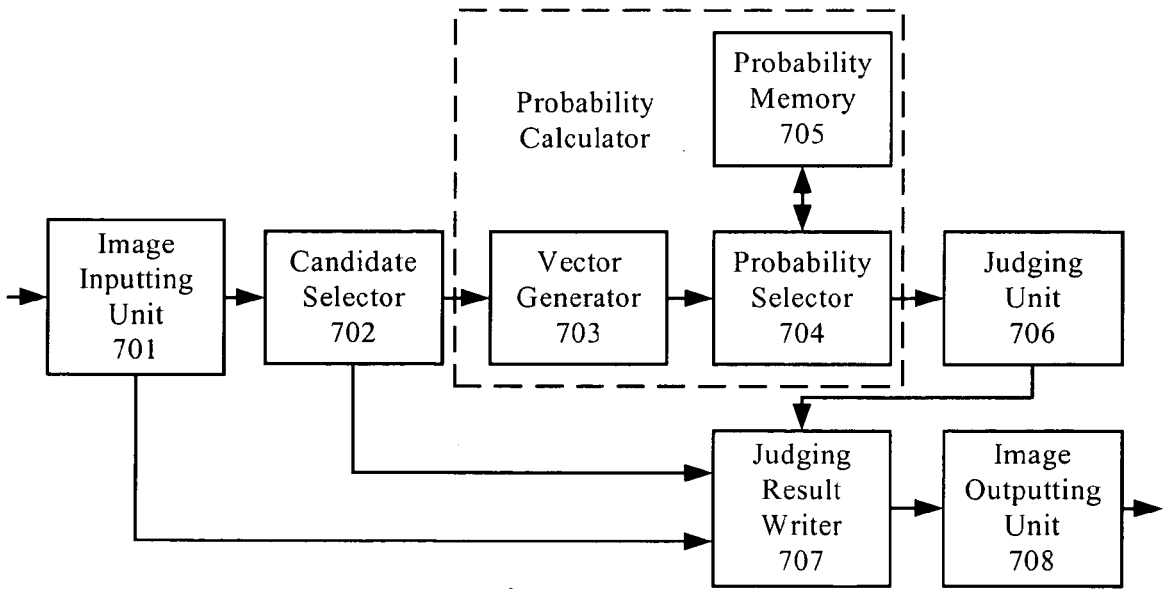
FIG. 7 is a schematic block diagram of another apparatus for processing an image according to the present invention.

FIG. 7 is a schematic block diagram of another apparatus for processing an image according to the present invention. 701 denotes an image inputting unit, 702 a candidate selector, 703 a vector generator, 704 a probability selector, and 705 a probability memory. These components function in the same way as corresponding components shown in FIG. 6.

As shown in FIG. 7, the components enclosed by the broken line constitute a probability calculator. Although it is shown that the probability calculator is composed of vector generator 703, probability selector 704 and probability memory 705, it should be understood that any conventional components may be taken to form a probability calculator. That is, vector generator 703, probability selector 704 and probability memory 705 do not constitute a restriction to the probability calculator. The importance is that the probability calculator will calculate a probability that one candidate for human face region represents a human face.

706 denotes a judging unit, 707 a judging result writer, and 708 an image outputting unit. Judging unit 706 judges whether the candidate for human face region represents a human face or not by comparing the probability retrieved by probability selector 704 with a threshold. Judging result writer 707 writes the judging result outputted from judging unit 706 as attached information to the image, for example, to the header file or footer file of the image in a predetermined format. Judging result writer 707 may also writes identification information of the candidate for human face region as additional attached information to the image, for example, to the header file or footer file of the image in a predetermined format.

The threshold used in judging unit 607 can be selected in the same principle as in step 404 of FIG. 4.

The predetermined format for saving the attached information and additional attached information is not important and does not constitute a restriction to the present invention. Any conventional format or data structure for saving data may be used.

Image outputting unit 708 outputs the image for further processing.

Figure 8:
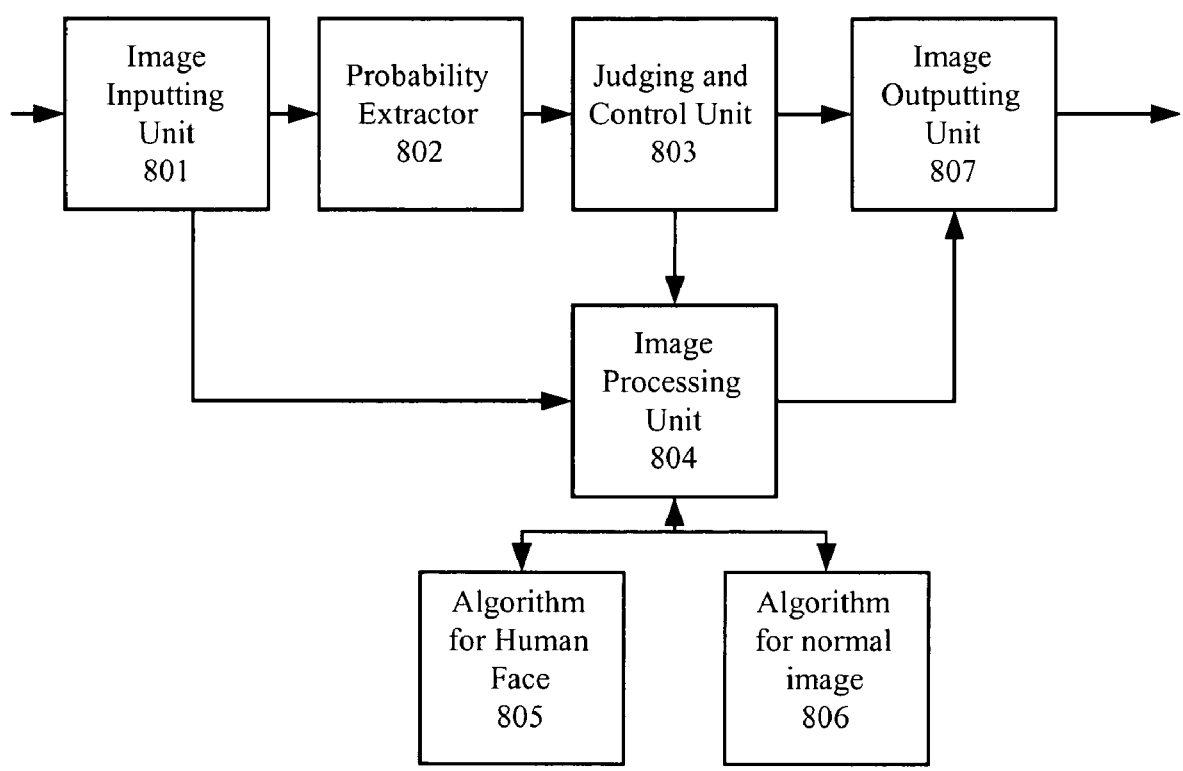
FIG. 8 is a schematic block diagram of an apparatus for processing an image to which probability for at least one candidate for human face region has been saved.

FIG. 8 is a schematic block diagram of an apparatus for processing an image to which probability for at least one candidate for human face region has been saved. 801 denotes an image inputting unit, 802 a probability extractor, 803 a judging and control unit, 804 an image processing unit, 805 algorithm for human face, 806 algorithm for normal image, 807 an image outputting unit.

Image inputting unit 801 receives an image and inputs its data into the apparatus for processing. Within the image, probability for at least one candidate for human face region has been saved, for example, in step 210 of FIG. 2 or step 310 of FIG. 3, and by probability writer 606 of FIG. 6.

Probability extractor 802 retrieves from the image, for example from the header file or footer file of the image, the probability for one candidate for human face region. If identification information of the candidate for human face region has been saved in the image, probability extractor 802 will also retrieves from the image the identification information of the candidate for human face region, that will be used by image processing unit 804.

Judging and control unit 803 compares the retrieved probability with a threshold, decides based on the comparison result whether the current candidate for human face region represents a human face or not, and controls image processing unit 804 accordingly.

The threshold used in judging and control unit 803 can be selected in the same principle as in step 404 of FIG. 4.

Image processing unit 804 processes the image inputted by image inputting unit 801 using different algorithms such as algorithm for human face 805 and algorithm for normal image 806 under the control of judging and control unit 803. If it is decided by judging and control unit 803 that the candidate for human face represents a human face, image processing unit 804 will process the candidate for human face that is identified by the identification information retrieved from the image with algorithm for human face 805, otherwise with algorithm for normal image 806. Image processing unit 804 for instance is the component within a printer or a display for processing data to be printed or displayed, or a device for identifying an object or a person.

Image outputting unit 807 outputs the image for further processing.

The following description refers to FIGS. 11 to 16, which concerns portrait probability of an image.

An image is called a portrait in the present invention when it contains at least one human face. If an image is a portrait, a special processing can be performed on this image. When determining whether or not an image is a portrait, it is necessary to calculate a probability that the image is a portrait.

In the present invention, the probability that an image is a portrait is called "portrait probability" of the image.

The higher the portrait probability of an image, the more likely the image is a portrait. That is an image is determined as a portrait if the portrait probability of the image is high enough.

Figure 11:
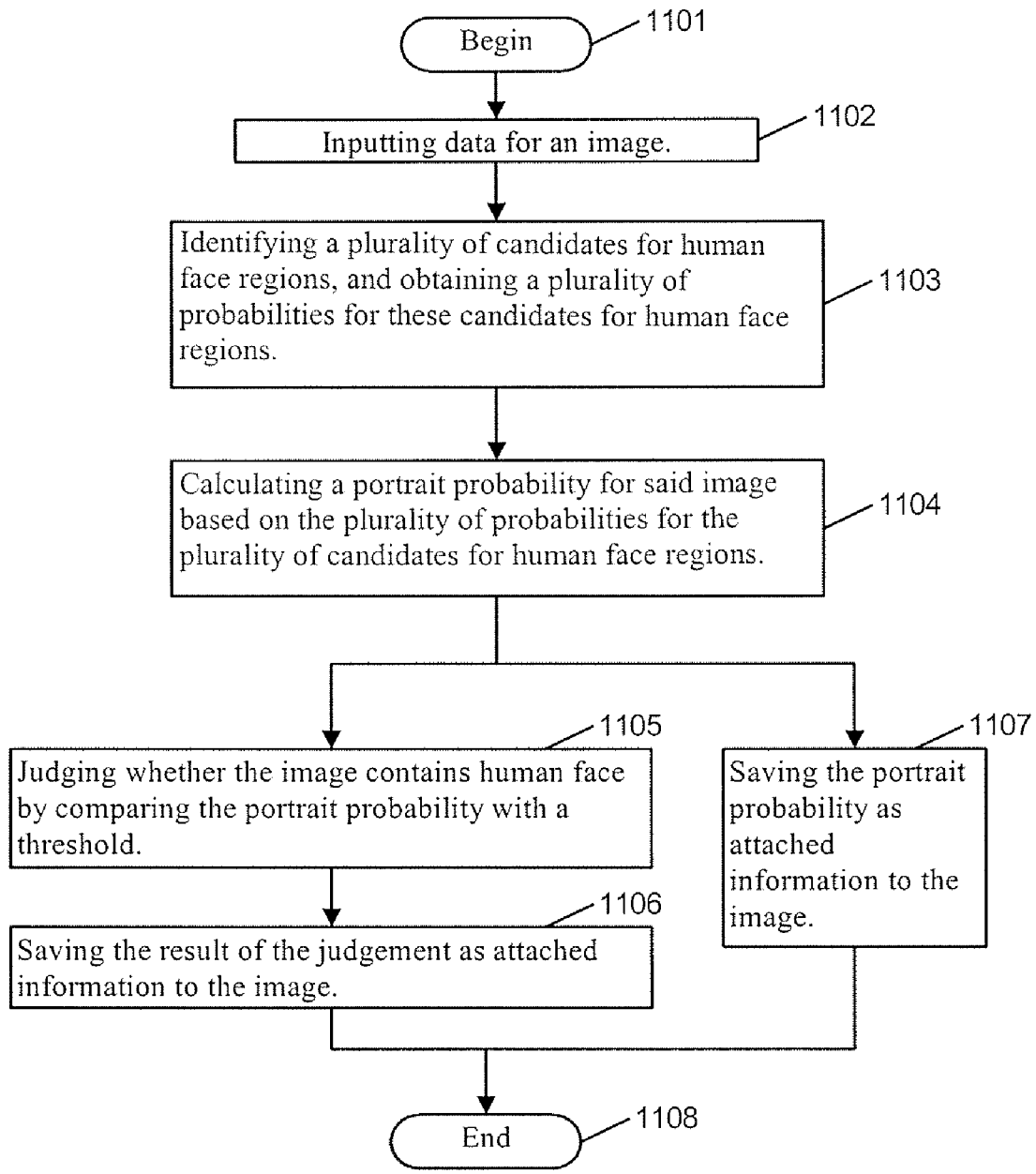
FIG. 11 is the flowchart of another method of processing an image according to the present invention, in which a portrait probability is calculated for the image.

FIG. 11 is the flowchart of another method of processing an image according to the present invention, in which a portrait probability is calculated for the image. The process begins at step 1101. An image is inputted at step 1102.

At step 1103, a plurality of candidates for human face regions are identified. And for each of the plurality of candidates for human face regions, a probability that the candidate for human face region represents a human face is obtained. Thus, a plurality of probabilities for human face regions are obtained.

Here, the method of obtaining the probabilities for these candidates for human face region may be any relevant method used in the prior art, or any method described in FIGS. 2 or 3. Alternatively, if the image inputted in step 1102 is an image that has been processed by the method of the present invention and probabilities for human face regions have been saved in the image, the probabilities for candidates for human face region can be directly retrieved from the image at step 1103.

At step 1104, a portrait probability is calculated for the image based on the plurality of probabilities obtained at step 1103.

A lot of methods may be used at step 1104 and do not constitute any restriction to the method of the present invention.

Assume the probabilities for candidates for human face region in the image are p1, p2, p3 . . . and PN. Three exemplified methods of calculating the portrait probability of an image are given as follows.

The first exemplified method of calculating the portrait probability is described below.

The following description gives three examples of calculating the portrait probability based on N probabilities for candidates for human face region. Here N is an integer greater than or equal to one.

Therefore, the probability that the first candidate for human face region is not a human face is $1-p1$; the probability that none of the first and second candidates for human face region is a human faces is $(1-p1)*(1-p2)$; and the probability that the image contains no human face is $$(1-p1)*(1-p2)*(1-p3)* \ldots *(1-pN) = \prod_{i=1}^{N}(1-pi).$$

Thus, the probability that the image contains a candidate for human face region, i.e., the portrait probability of the image may be calculated with following formula (1):

$$P = 1 - \prod_{i=1}^{N}(1-pi). \quad (1)$$

Where, pi denotes the probability for the i-th candidate for human face region; N denotes the number of candidates for human face region in the image; P denotes the portrait probability of the image.

Figure 16:
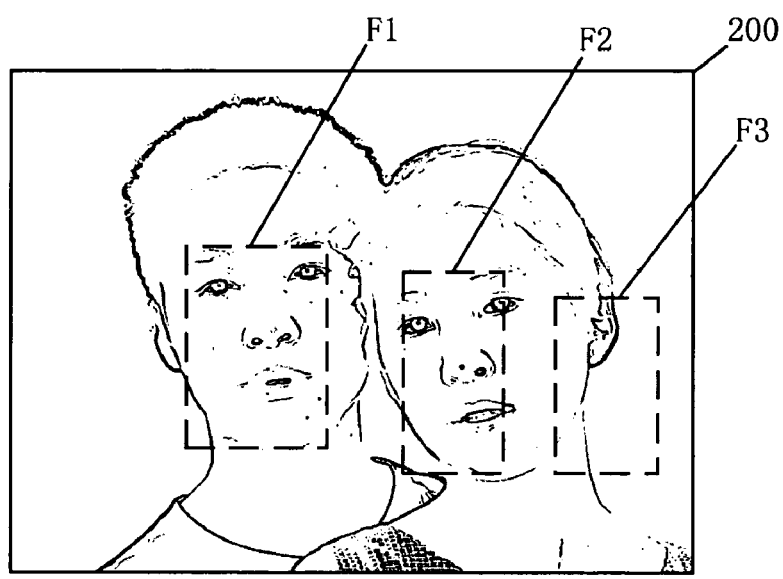
FIG. 16 shows another image for which a portrait probability is calculated.

In the exemplified image 200 shown in FIG. 16, there are three candidates for human face region (illustrated in dash line). The probabilities for the three candidates are denoted as F1, F2, and F3. For instance, F1 equals to 0.8; F2 equals to 0.5 and F3 equals to 0.1.

If calculated with formula (1), the portrait probability of image 200 in FIG. 16 is $P=1-(1-0.8)*(1-0.5)*(1-0.1)=0.91.$ The second exemplified method of calculating the portrait probability is described below.

First, select the first K greatest probabilities for candidates for human face region, which are denoted as ps1, ps2, ps3, . . . psK, where K is an integer between 1 and N.

The portrait probability of the image is mainly dependent on the candidates for human face regions with the first K greatest probabilities. Thus, the probability that the image contains no human face is $$(1-ps1)*(1-ps2)*(1-ps3)* \ldots *(1-psK) = \prod_{i=1}^{K}(1-psi)$$

Thus, the probability that the image contains a candidate for human face region, i.e., the portrait probability of the image may be calculated with following formula (2):

$$P = 1 - \prod_{i=1}^{K}(1-psi) \quad (2)$$

Where, psi denotes the i-th greatest probability for candidate for human face region; K denotes the number of the selected candidates for human face region in the image; P denotes the portrait probability of the image.

In the image shown in FIG. 16, the first two greatest probabilities for candidates for human face region are 0.8, 0.5. (Here, let K be 2.)

Thus, if calculated with formula (2), the portrait probability of image 200 is $P=1-(1-0.8)*(1-0.5)=0.9.$ The third exemplified method of calculating the portrait probability is described below.

The maximum of the probabilities for candidates for human face region is selected as the portrait probability of the image. That is, the portrait probability of the image is calculated with following formula (3):

$P=\text{Max}\{p1, p2, p3, \ldots pN\} \quad (3)$

Where, pi denotes the probability for the i-th candidate for human face region; N denotes the number of candidates for human face region in the image; P denotes the portrait probability of the image.

In the image shown in FIG. 16, the greatest probability for candidate for human face region is 0.8.

Thus, if calculated with formula (3), the portrait probability of image 200 is $P=0.8$.

At step 1105, it is judged whether the image contains human face by comparing the portrait probability with a threshold.

The threshold used here may be in the range of 0.4 to 0.8, and preferably is 0.6.

At step 1106, the result of the judgment is saved as attached information to the image, for example, to the header file or footer file of the image in a predetermined format.

At step 1107, the portrait probability is saved as attached information to the image, for example, to the header file or footer file of the image in a predetermined format.

In both of steps 1106 and 1107, the predetermined format for saving the attached information and additional attached information is not important and does not constitute a restriction to the present invention. Any conventional format or data structure for saving data may be used.

Figure 12:
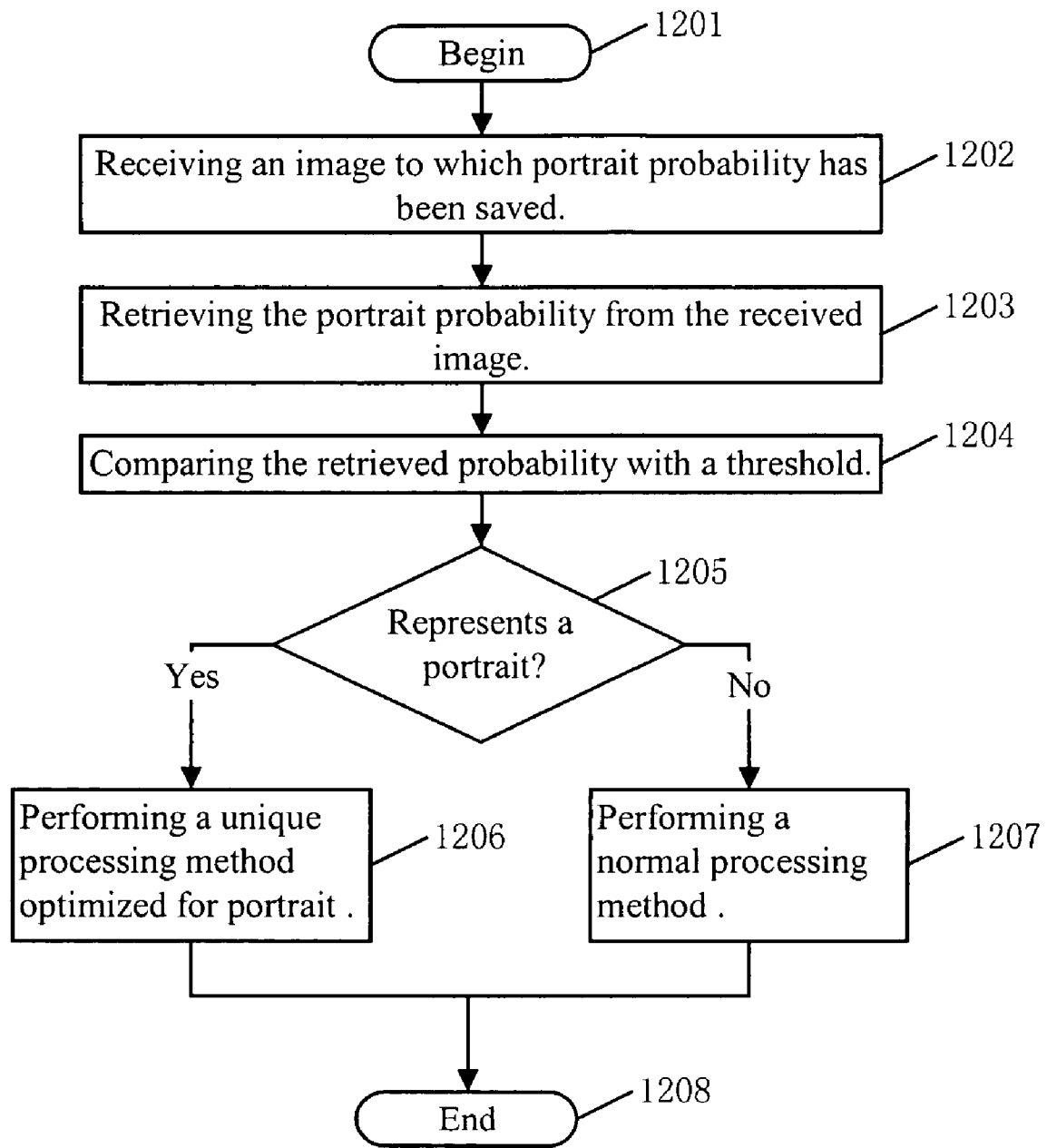
FIG. 12 is the flowchart of another method of processing an image to which portrait probability has been saved.

The image to which judging results or probabilities have been saved can be used widely. FIG. 12 illustrates an application of such kind of images.

The above process ends at step 1108.

FIG. 12 is the flowchart of another method of processing an image to which portrait probability has been saved. The process starts at step 1201. At step 1202, an image to which portrait probability has been saved is received.

As stated above, the probability information might be saved as attached information in the header file or footer file of the image in a predetermined format.

At step 1203, the portrait probability is retrieved from the image, for example from the header file or footer file of the image.

At step 1204, the retrieved probability is compared with a threshold. At step 1205, it is decided based on the comparison result of step 1204 whether the current image is a portrait, i.e., contains human face(s). The above threshold can be selected in such a way that any image having a portrait probability above the threshold is a portrait.

If the judging result of step 1205 is positive, i.e., the image is a portrait, the process goes to step 1206; otherwise, step 1207.

At step 1206, a unique processing method optimized for portrait is performed in the image. The unique processing method might be performed by a printer, for example, a printer driver or an application program for printer 1713 in FIG. 17, such that human faces will be printed with improved printing quality. The unique processing method may also be performed by a display, for example an application program for display 1714 in FIG. 17, such that human faces will be displayed with high quality.

The unique processing method in step 1206 may be any process performed on an image. For example, it may be a process of correcting red eyes in an image, or a process of toning down skin color in an image. The value of the threshold used in step 1204 may be selected as a higher value or as a lower value according to different applications.

In the circumstance of red eye correcting, for example, it would be unacceptable to users if a portion of an image (for instance, a red logo) that is not an eye is corrected as a red eye. Thus, the threshold in step 1204 could be set to a higher value so that less candidates for human face regions would be judged as representing human face and thus less portions of the image would be corrected as red eyes.

In the circumstance of toning down human skin in an image, for example, it would be acceptable (sometimes unnoticeable) to users if a portion of an image (such as a table) that includes no human skin color is toned down. Thus, the threshold in step 1204 could be set to a lower value so that more candidates for human face regions would be judged as representing human face and thus more portions of the image would be toned down.

In one word, the threshold used in step 1204 may be selected according to the users' satisfaction of the processing result of the image.

At step 1207, a normal processing method is performed in the candidate for human face region.

The process ends at step 1208.

Figure 13:
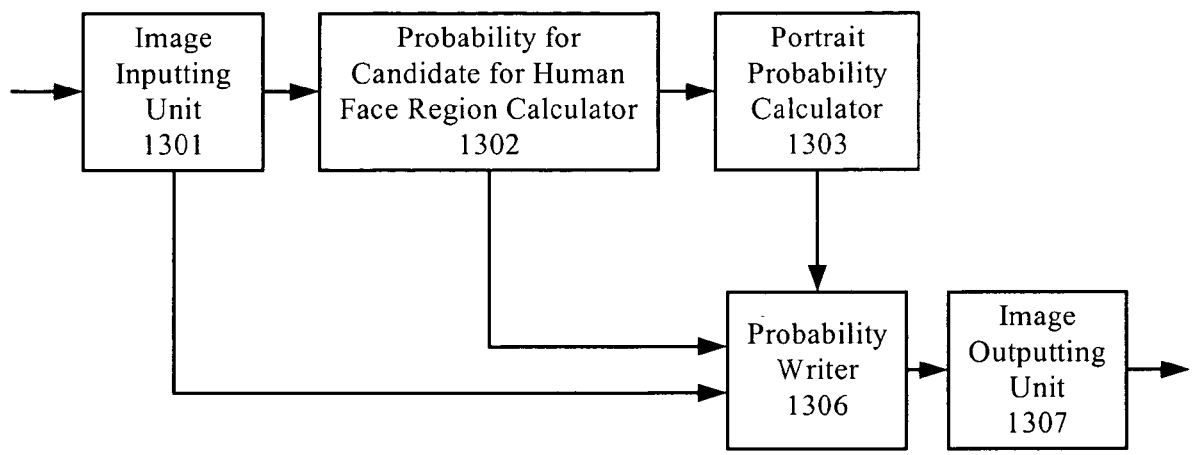
FIG. 13 is a schematic block diagram of another apparatus for processing an image according to the present invention.

FIG. 13 is a schematic block diagram of another apparatus for processing an image according to the present invention; 1301 denotes an image inputting unit, 1302 a probability for candidate for human face region calculator, 1303 a portrait probability calculator, 1306 a probability writer, 1307 an image outputting unit. The key component of the apparatus shown in this figure is portrait probability calculator 1303.

Image inputting unit 1301 receives an image and inputs its data into the apparatus for processing. Probability for candidate for human face region calculator 1302 identifies a plurality of candidates for human face region and calculates a probability for each of the identified candidate for human face region that this candidate for human face region represents a human face.

The probabilities for candidates for human face region may be calculated by way of the probability calculator in FIG. 6, by using the methods shown in FIGS. 2 or 3, or any prior methods of calculating probability for candidate for human face region. Alternatively, the probabilities for candidates for human face region may be retrieved from the image if the image has been processed by the methods shown in FIGS. 2 or 3 and probabilities for candidates for human face region have been saved in the image. Different ways of calculating or obtaining probabilities for candidates for human face region do not constitute any restriction to the present invention.

Portrait probability calculator 1303 calculates a portrait probability based on the probabilities calculated or obtained by probability for candidate for human face region calculator 1302. The calculation performed in portrait probability calculator 1303 may be the same as that in step 1104 in FIG. 11.

Probability writer 1306 writes the probability calculated by portrait probability calculator 1303 as attached information into the image being processed, for instance, to its header file or footer file in a predetermined format.

The predetermined format for saving the attached information and additional attached information is not important and does not constitute a restriction to the present invention. Any conventional format or data structure for saving data may be used.

Image outputting unit 1307 outputs the image for further processing.

Figure 14:
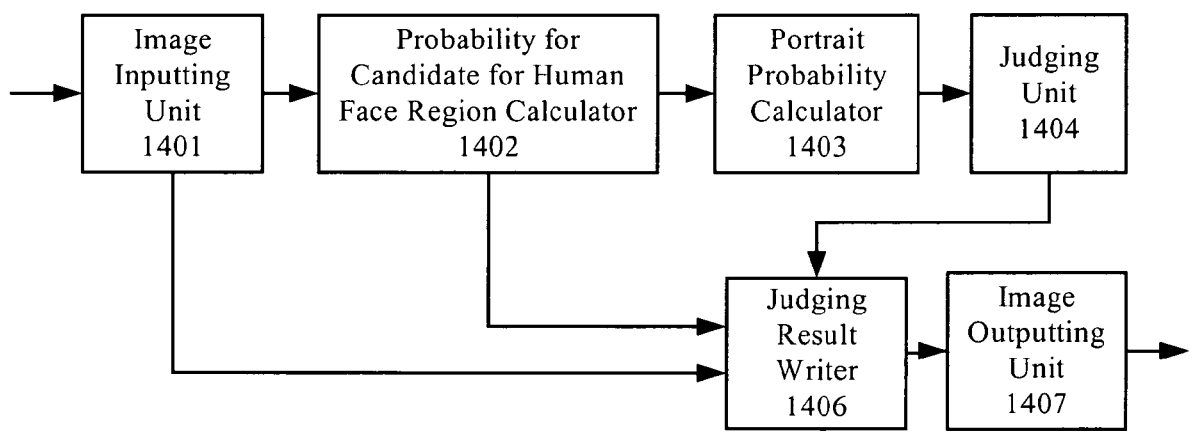
FIG. 14 is a schematic block diagram of another apparatus for processing an image according to the present invention.

FIG. 14 is a schematic block diagram of another apparatus for processing an image according to the present invention. 1401 denotes an image inputting unit, 1402 a probability for candidate for human face region calculator, 1403 a portrait probability calculator. These components function in the same way as corresponding components shown in FIG. 13.

1406 denotes a judging unit, 1407 a judging result writer, and 1408 an image outputting unit. Judging unit 1406 judges whether the image is a portrait or not by comparing the portrait probability calculated by portrait probability calculator 1403 with a threshold. Judging result writer 1407 writes the judging result outputted from judging unit 1406 as attached information to the image, for example, to the header file or footer file of the image in a predetermined format.

The threshold used in judging unit 1407 can be selected in the same principle as in step 1204 of FIG. 12.

The predetermined format for saving the attached information and additional attached information is not important and does not constitute a restriction to the present invention. Any conventional format or data structure for saving data may be used.

Image outputting unit 1408 outputs the image for further processing.

Figure 15:
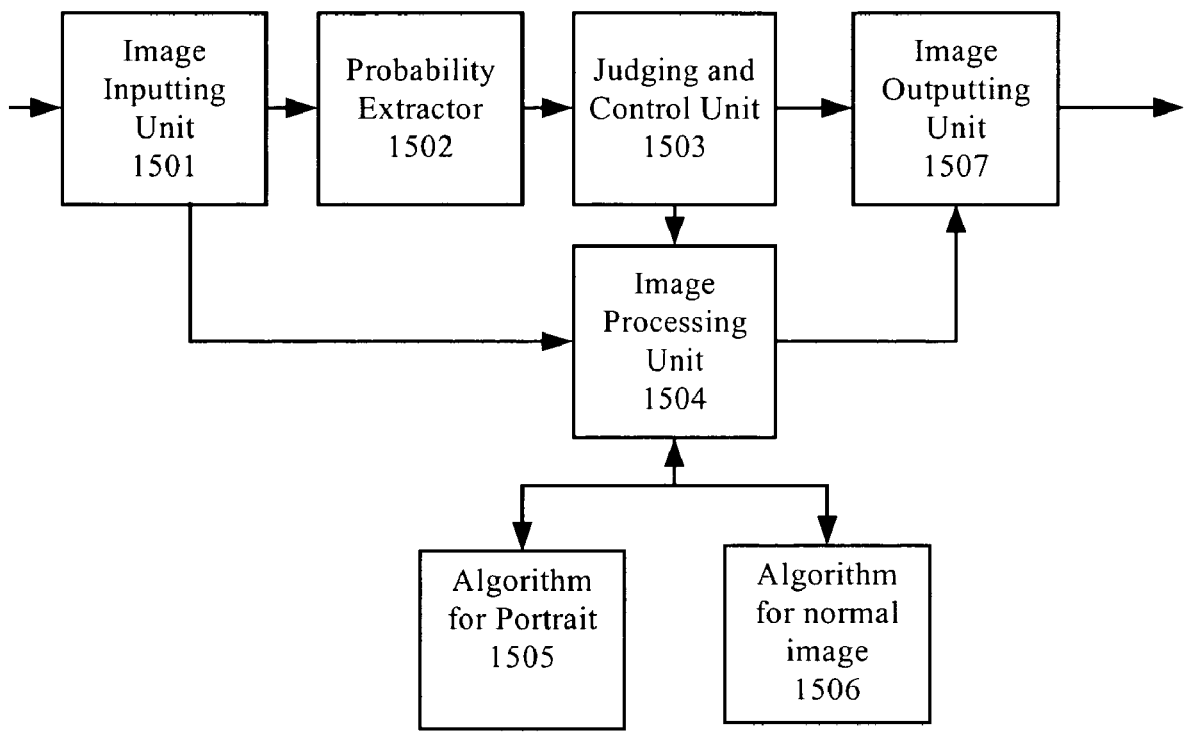
FIG. 15 is a schematic block diagram of another apparatus for processing an image to which portrait probability has been saved.

FIG. 15 is a schematic block diagram of another apparatus for processing an image to which portrait probability has been saved. 1501 denotes an image inputting unit, 1502 a probability extractor, 1503 a judging and control unit, 1504 an image processing unit, 1505 algorithm for portrait, 1506 algorithm for normal image, 1507 an image outputting unit.

Image inputting unit 1501 receives an image and inputs its data into the apparatus for processing. Within the image, portrait probability for the image has been saved, for example, in step 1107 of FIG. 11, and by probability writer 1306 of FIG. 13.

Probability extractor 1502 retrieves from the image, for example from the header file or footer file of the image, the probability for one candidate for human face region.

Judging and control unit 1503 compares the retrieved probability with a threshold, decides based on the comparison result whether the current image is a portrait or not, and controls image processing unit 1504 accordingly.

The threshold used in judging and control unit 1503 can be selected in the same principle as in step 1204 of FIG. 12.

Image processing unit 1504 processes the image inputted by image inputting unit 1501 using different algorithms such as algorithm for portrait 1505 and algorithm for normal image 1506 under the control of judging and control unit 1503. If it is decided by judging and control unit 1503 that the image is a portrait, image processing unit 1504 will process the image with algorithm for portrait 1505, otherwise with algorithm for normal image 1506. Image processing unit 1504 for instance is the component within a printer or a display for processing data to be printed or displayed.

Image outputting unit 1507 outputs the image for further processing.

Figure 17:
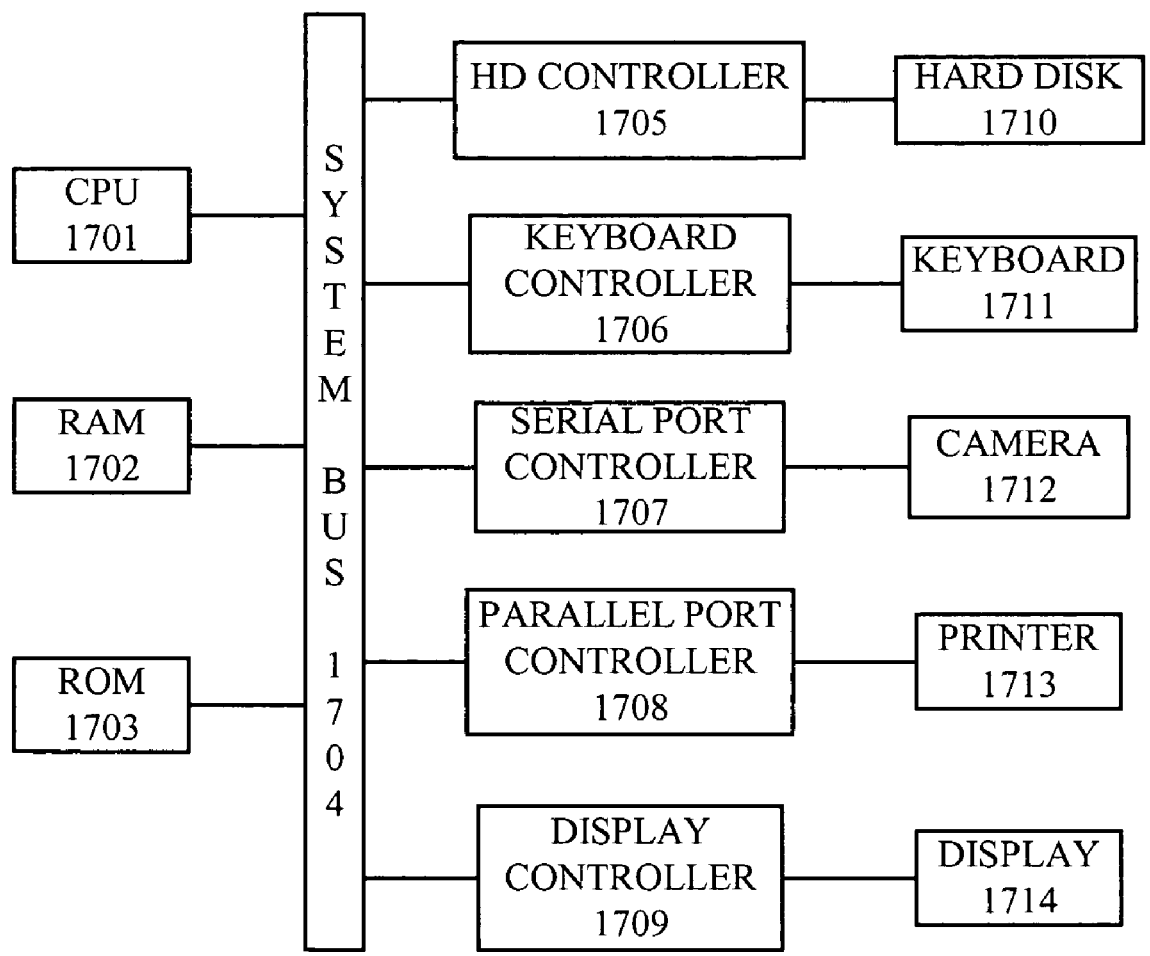
FIG. 17 schematically shows an image processing system in which each method shown in FIGS. 1 to 5, 11, and 12 can be implemented.

FIG. 17 schematically shows an image processing system in which each method shown in FIGS. 1 to 5, 11 and 12 can be implemented. The image processing system shown in FIG. 17 comprises a CPU (Central Processing Unit) 1701, a RAM (Random Access Memory) 1702, a ROM (Read only Memory) 1703, a system bus 1704, a HD (Hard Disk) controller 1705, a keyboard controller 1706, a serial port controller 1707, a parallel port controller 1708, a display controller 1709, a hard disk 1710, a keyboard 1711, a camera 1712, a printer 1713 and a display 1714. Among these components, connected to system bus 1704 are CPU 1701, RAM 1702, ROM 1703, HD controller 1705, keyboard controller 1706, serial port controller 1707, parallel port controller 1708 and display controller 1709. Hard disk 1710 is connected to HD controller 1705, and keyboard 1711 to keyboard controller 1706, camera 1712 to serial port controller 1707, printer 1713 to parallel port controller 1708, and display 1714 to display controller 1709.

The functions of each component in FIG. 17 are well known in the art and the architecture shown in FIG. 17 is conventional. Such an architecture not only applies to personal computers, but also applies to hand held devices such as Palm PCs, PDAs (personal data assistants), digital cameras, etc. In different applications, some of the components shown in FIG. 17 may be omitted. For instance, if the whole system is a digital camera, parallel port controller 1708 and printer 1713 could be omitted, and the system can be implemented as a single chip microcomputer. If application software is stored in EPROM or other non-volatile memories, HD controller 1705 and hard disk 1710 could be omitted.

The whole system shown in FIG. 17 is controlled by computer readable instructions, which are usually stored as software in hard disk 1710 (or as stated above, in EPROM, or other non-volatile memory). The software can also be downloaded from the network (not shown in the figure). The software, either saved in hard disk 1710 or downloaded from the network, can be loaded into RAM 1702, and executed by CPU 1701 for implementing the functions defined by the software.

It involves no inventive work for persons skilled in the art to develop one or more pieces of software based on one or more of the flowcharts shown in FIGS. 1 to 5, 11 and 12. The software thus developed will carry out the method of training an image processing apparatus as shown in FIG. 1, the method of processing an image as shown in FIG. 2, the method of processing an image as shown in FIG. 3, the method of processing an image as shown in FIG. 4, or the method of identifying a person in an image as shown in FIG. 5, the method of processing an image as shown in FIG. 11, the method of processing an image as shown in FIG. 12.

In some sense, the image processing system shown in FIG. 17, if supported by software developed based on flowcharts shown in FIGS. 1 to 5, 11 and 12, achieves the same functions as the apparatus for processing image shown in FIGS. 6 to 8 and 13 to 15.

Figure 18:
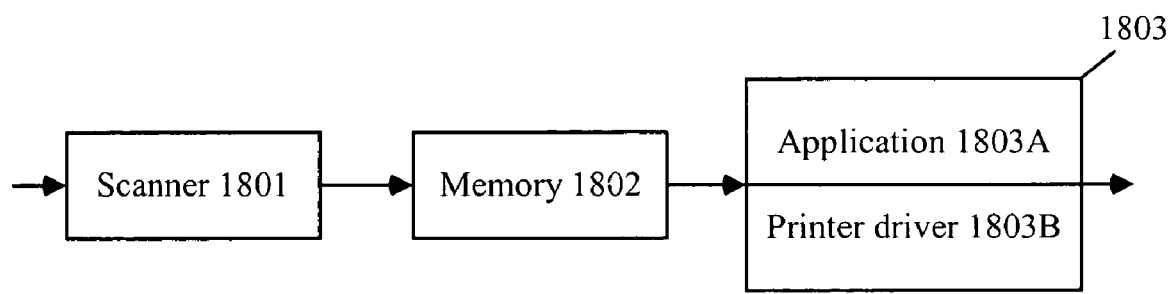
FIG. 18 shows an example of the apparatus for processing an image.

FIG. 18 shows an example of the apparatus for processing an image.

The apparatus shown in FIG. 18 comprises a scanner 1801, a memory 1802, and a printer 1803.

Scanner 1801 first scans an image and inputs its data into memory 1802 for processing. For example, scanner 1801 scans image 200 in FIG. 16. The portrait probability of image 200 for example is 0.91.

Scanner 1801 is connected to memory 1802. The scanned image data and the portrait probability of image 200 are stored in memory 1802.

Memory 1802 is connected to printer 1803. Printer 1803 first receives the portrait probability of image 200 and compares it with a threshold. On the basis of the comparison result, printer 1803 decides whether image 200 contains a human face. In this example, the portrait probability of image 200 is 0.91; printer 1803 judges image 200 as a portrait.

Upon the result of the judgment, application software program 1803A issues a drawing command group to printer driver 1803B of printer 1803. Printer driver 1803B processes the print request and drawing commands input from application software program 1803A, generates print data that printer 1803 can print and send the print data to printer 1803.

Since image 200 is judged as a portrait, printer 1803 will reproduce the human skin. When a printer reproduces a human skin, an image with stronger red than an original image is apt to be preferable to human sense.

In the present embodiment, under the control of application software program 1803A, the printer makes the red color, which represent human skin stronger. Thus, printer 1803 can reproduce image 200 with a high quality.

The present invention also provides storage media on which codes of computer programs implementing the methods of the present invention are recorded.

As a storage medium for supplying a computer program, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

As can be seen from the above, the method of the present invention provides a fast approach for determining portrait probability of an image and outputting the determined portrait probability for further processing. The method allows for the precision determination of a portrait under different scales, orientation condition. Therefore, in accordance with the present invention, with the method or apparatus, whether the image is a portrait can be quickly and effectively determined, the determined image can be further processed.

The present invention includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores computer programs for implementing the flowcharts shown in FIGS. 1 to 5, 11 and 12.

The embodiments explained above are specialized to determine portrait probability of an image and process it; however, the present invention is not limited to determining portrait probability, is applicable to other determination methods, for example, a method to detect the probability where there is flaw portion on a circuit board.

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. An image processing method, comprising:
a face probability calculating step of identifying candidates for a human face region within an image and calculating a human face probability that each candidate for the human face region represents a human face;
a portrait probability calculating step of multiplying a value corresponding to one human face probability of one candidate by values of the other human face probabilities of the other candidates and outputting a portrait probability that the image is a portrait; and
a determining step of determining whether the image is the portrait by comparing the portrait probability with a threshold value,
wherein said portrait probability calculating step includes a selecting step of selecting higher K human face probabilities from among the human face probabilities for the candidates calculated in said face probability calculating step and a multiplying step of multiplying a value corresponding to one of the selected K human face probabilities by the values corresponding to the other selected K human face probabilities.

2. An image processing method according to claim 1, further comprising an image processing step of processing the image in accordance with the result in said judging step.

3. An image processing method according to claim 1, further comprising a saving step of saving human face probabilities for the candidates regarding each of a plurality of partial spaces in M-dimensional space,
wherein, in said face probability calculating step, M-dimensional vectors are generated by applying a predetermined algorithm to the candidates for the human face region and a probability that the partial spaces corresponding to the generated M-dimensional vectors represent a human face is calculated from among the saved human face probabilities.

4. An image processing apparatus, comprising:
a face probability calculating unit that identifies candidates for a human face region within an image and calculates a human face probability that each candidate for the human face region represents a human face;
a portrait probability calculating unit that multiplies a value corresponding to one human face probability of one candidate by values of the other human face probabilities of the other candidates and outputting a portrait probability that the image is a portrait; and
a determining unit that determining whether the image is the portrait by comparing the portrait probability with a threshold value,
wherein said portrait probability calculating unit includes a selecting unit that selects higher K human face probabilities from among the human face probabilities for the candidates calculated in said face probability calculating unit and a multiplying unit that multiplies a value corresponding to one of the selected K human face probabilities by the values corresponding to the other selected K human face probabilities.

5. A computer-readable medium encoded with a computer program for performing an image processing method, said method comprising:
a face probability calculating step of identifying candidates for a human face region within an image and calculating a human face probability that each candidate for the human face region represents a human face;
a portrait probability calculating step of multiplying a value corresponding to one human face probability of one candidate by values of the other human face probabilities of the other candidates and outputting a portrait probability that the image is a portrait; and
a determining step of determining whether the image is the portrait by comparing the portrait probability with a threshold values,
wherein said portrait probability calculating step includes a selecting step of selecting higher K human face probabilities from among the human face probabilities for the candidates calculated in said face probability calculating step and a multiplying step of multiplying a value corresponding to one of the selected K human face probabilities by the values corresponding to the other selected K human face probabilities.

* * * * *

UNITED STATES PATENT AND TRADEMARK OFFICE
CERTIFICATE OF CORRECTION

| | |
|---|---|
| PATENT NO. | : 7,415,137 B2 |
| APPLICATION NO. | : 10/716671 |
| DATED | : August 19, 2008 |
| INVENTOR(S) | : Chen et al. |

It is certified that error appears in the above-identified patent and that said Letters Patent is hereby corrected as shown below:

COLUMN 4:
Line 16, "combined-with" should read --combined with--.

COLUMN 5:
Line 43, "103.," should read --103,--.

COLUMN 6:
Line 23, "note" should read --noted--.

COLUMN 7:
Line 59, "$-\infty, 0.111]$," should read -- $-\infty, 0.11]$,--.

COLUMN 11:
Line 26, "0.85]." should read --0.85).--.

COLUMN 12:
Line 33, "closed" should read --close--.

COLUMN 14:
Line 45, "aperson" should read --a person--.

COLUMN 15:
Line 33, "writes" should read --write--.

COLUMN 16:
Line 33, "retrieves" should read --retrieve--.

UNITED STATES PATENT AND TRADEMARK OFFICE
CERTIFICATE OF CORRECTION

PATENT NO. : 7,415,137 B2
APPLICATION NO. : 10/716671
DATED : August 19, 2008
INVENTOR(S) : Chen et al.

It is certified that error appears in the above-identified patent and that said Letters Patent is hereby corrected as shown below:

COLUMN 24:
Line 20, claim 4 "determining" (second occurrence) should read --determines--.
Line 45, claim 5 "values," should read --value,--.

Signed and Sealed this

Tenth Day of March, 2009

JOHN DOLL
*Acting Director of the United States Patent and Trademark Office*